United States Patent
Chang et al.

(10) Patent No.: US 9,443,023 B2
(45) Date of Patent: *Sep. 13, 2016

(54) SEARCHING AND CLASSIFYING INFORMATION ABOUT GEOGRAPHIC OBJECTS WITHIN A DEFINED AREA OF AN ELECTRONIC MAP

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,241

(22) Filed: Jun. 3, 2014

(65) Prior Publication Data

US 2015/0052116 A1    Feb. 19, 2015

Related U.S. Application Data

(63) Continuation of application No. 13/969,434, filed on Aug. 16, 2013.

(51) Int. Cl.
*G06F 17/30* (2006.01)

(52) U.S. Cl.
CPC ....... *G06F 17/30867* (2013.01); *G06F 17/301* (2013.01); *G06F 17/3087* (2013.01)

(58) Field of Classification Search
CPC ........... G06F 17/301; G06F 17/30867; G06F 17/3087
USPC .......................... 707/732, 722, 724, 736, 725
See application file for complete search history.

(56) References Cited

U.S. PATENT DOCUMENTS

| | | |
|---|---|---|
| 7,248,965 B2 | 7/2007 | Tanizaki et al. |
| 7,373,244 B2 | 5/2008 | Kreft |
| 7,373,246 B2 | 5/2008 | O'Clair |
| 7,555,725 B2 | 6/2009 | Abramson et al. |
| 7,933,897 B2 * | 4/2011 | Jones ................ G06F 17/30241 707/723 |
| 7,937,402 B2 | 5/2011 | Feng et al. |
| 7,949,642 B2 | 5/2011 | Yang et al. |
| 8,145,703 B2 | 3/2012 | Frishert et al. |
| 8,306,921 B2 | 11/2012 | Kalik et al. |

(Continued)

OTHER PUBLICATIONS

Preliminary Amendment, Jun. 3, 2014, for U.S. Appl. No. 13/969,434, filed Aug. 16, 2013 by B.W. Chang et al., Total 5 pp. [57.349 (PrelimAmend)].

U.S. Appl. No. 13/969,434, filed Aug. 16, 2013, entitled "Searching and Classifying Information About Geographic Objects Within a Define Area of an Electronic Map", invented by Chang, B.W., and S.K. Rakshit, Total 24 pp. [57.349 (Appln)].

(Continued)

*Primary Examiner* — Vincent Boccio

(74) *Attorney, Agent, or Firm* — Janaki K. Davda; Konrad, Raynes, Davda & Victor LLP

(57) ABSTRACT

Provided are a method, computer program product and system for classifying and displaying information. A boundary within an electronic map is determined, based on a drawn closed shape. At least one geographic object, at least partially within the boundary, is identified. Each geographic object is representable by one or more geographic coordinates. A search is performed, on an external data source, for unstructured information associated with the at least one geographic object and a plurality of search results are received. The plurality of search results are classified and displayed according to a user topic of interest.

7 Claims, 5 Drawing Sheets

(56) References Cited

U.S. PATENT DOCUMENTS

| | | | |
|---|---|---|---|
| 8,452,769 B2 | 5/2013 | Altaf et al. | |
| 2002/0091758 A1 | 7/2002 | Singh et al. | |
| 2003/0061211 A1 | 3/2003 | Shultz et al. | |
| 2006/0026170 A1 | 2/2006 | Kreitler et al. | |
| 2007/0143345 A1* | 6/2007 | Jones | G06F 17/30241 707/999.107 |
| 2009/0083659 A1* | 3/2009 | Tatehata et al. | 715/784 |
| 2010/0131501 A1* | 5/2010 | Deeming | G06F 17/30241 707/724 |
| 2011/0007076 A1 | 1/2011 | Nielson et al. | |
| 2011/0184945 A1* | 7/2011 | Das | G01C 21/206 707/724 |
| 2011/0193795 A1* | 8/2011 | Seidman et al. | 345/173 |
| 2012/0268485 A1 | 10/2012 | Icho et al. | |
| 2012/0278752 A1 | 11/2012 | Parker | |
| 2013/0054642 A1* | 2/2013 | Morin | G06F 17/30557 707/770 |
| 2014/0052680 A1* | 2/2014 | Nitz | G06N 5/02 706/46 |
| 2014/0052681 A1* | 2/2014 | Nitz | H04L 51/02 706/46 |

OTHER PUBLICATIONS

Office Action 1, May 26, 2015, for U.S. Appl. No. 13/969,434, filed Aug. 16, 2013 by B.W. Chang et al., Total 25 pp. [57.349 (OA1)].

Response to Office Action 1, Aug. 11, 2015, for U.S. Appl. No. 13/969,434, filed Aug. 16, 2013 by B.W. Chang et al., Total 12 pp. [57.349 (ROA1)].

Final Office Action, Sep. 28, 2015, for U.S. Appl. No. 13/969,434, filed Aug. 16, 2013 by B.W. Chang et al., Total 21 pp. [57.349 (FOA)].

Response to Final Office Action, Dec. 21, 2015, for U.S. Appl. No. 13/969,434, filed Aug. 16, 2013 by B.W. Chang et al., Total 10 pp. [57.349 (RFOA)].

Office Action 3, Jan. 14, 2016, for U.S. Appl. No. 13/969,434, filed Aug. 16, 2013 by B.W. Chang et al., Total 22 pp. [57.349 (OA3)].

Response to Office Action 3, Apr. 13, 2016, for U.S. Appl. No. 13/969,434, filed Aug. 16, 2013 by B.W. Chang et al., Total 11 pp. [57.349 (ROA3)].

Notice of Allowance, May 20, 2016, for U.S. Appl. No. 13/969,434, filed Aug. 16, 2013, Total 13 pages.

* cited by examiner

SEARCHING AND CLASSIFYING INFORMATION ABOUT GEOGRAPHIC OBJECTS WITHIN A DEFINED AREA OF AN ELECTRONIC MAP

BACKGROUND OF THE INVENTION

The present invention relates generally to searching and classifying unstructured information about geographic objects within a bounded area of an electronic map.

Technology for performing a text based search of a geographic area based on information stored in a point of interest database is generally known. Generally, information about points of interest is stored in a structured database including the point of interest location and characteristics. For example, restaurants are stored as points of interest in a structured database containing fields describing restaurant properties (e.g. type of food, location, price, etc.). A search with certain descriptive characteristics (e.g., pizza) within a zip code displays a list of matching restaurants, and each matching restaurant is represented by a symbol and located on the electronic map.

More recently, unstructured items of information (e.g., blogs, articles, documents, images, text, media, etc.) are geotagged and posted to the Internet. Geotagging is the process of adding geographical identification metadata to content. Recently, as the result of the proliferation of global positioning technology, images posted to the Internet often have geotags. The geo-tagged content may be relevant and useful for geographic object searching.

Unstructured information, without any metadata suggesting a category for classification, may be classified with statistical methods, machine learning methods, or ontological methods. An ontology defines the terms used to describe and represent an area of knowledge. Information may be classified using an ontology domain schema containing domain entities organized into categories and interconnected by relationships.

SUMMARY

Provided are a method, computer program product and system for classifying and displaying information. A boundary within an electronic map is determined, based on a drawn closed shape. At least one geographic object, at least partially within the boundary, is identified. Each geographic object is representable by one or more geographic coordinates. A search is performed, on at least one external data source, for unstructured information associated with the at least one geographic object and a plurality of search results are received. The plurality of search results are classified and displayed according to a user topic of interest.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

A point of interest database, used in connection with electronic maps, is often limited to information for assisting with driving directions. Often individuals would like to know information that is not generally available in a point of interest database, as well as regions. Examples of such information include latest school ratings, sentiment about schools, current emergency room wait times, police activity, latest health inspection reports for a restaurant, etc. Regions are areas with one or more common characteristics or features (e.g., school zones, water districts, etc.). Individuals may desire information about geographic objects, which include points of interest, regions, and entities (e.g. cities, towns, associations, etc.). Further, individuals may prefer defining a bounded area and topic of interest and receiving a categorized list of information associated with the geographic objects within the bounded area.

Additionally, an individual may want to know real-time information such as current emergency room wait times, within a custom bounded area, wherein the custom bounded area is drawn, or calculated based on a start point and one or more boundary parameters. By way of example, a calculated bounded area may be generated based on driving distance at the speed limit within a provided time parameter (e.g., distance driven from start point within five minutes of driving based on speed limit and driving conditions).

Figure 1:
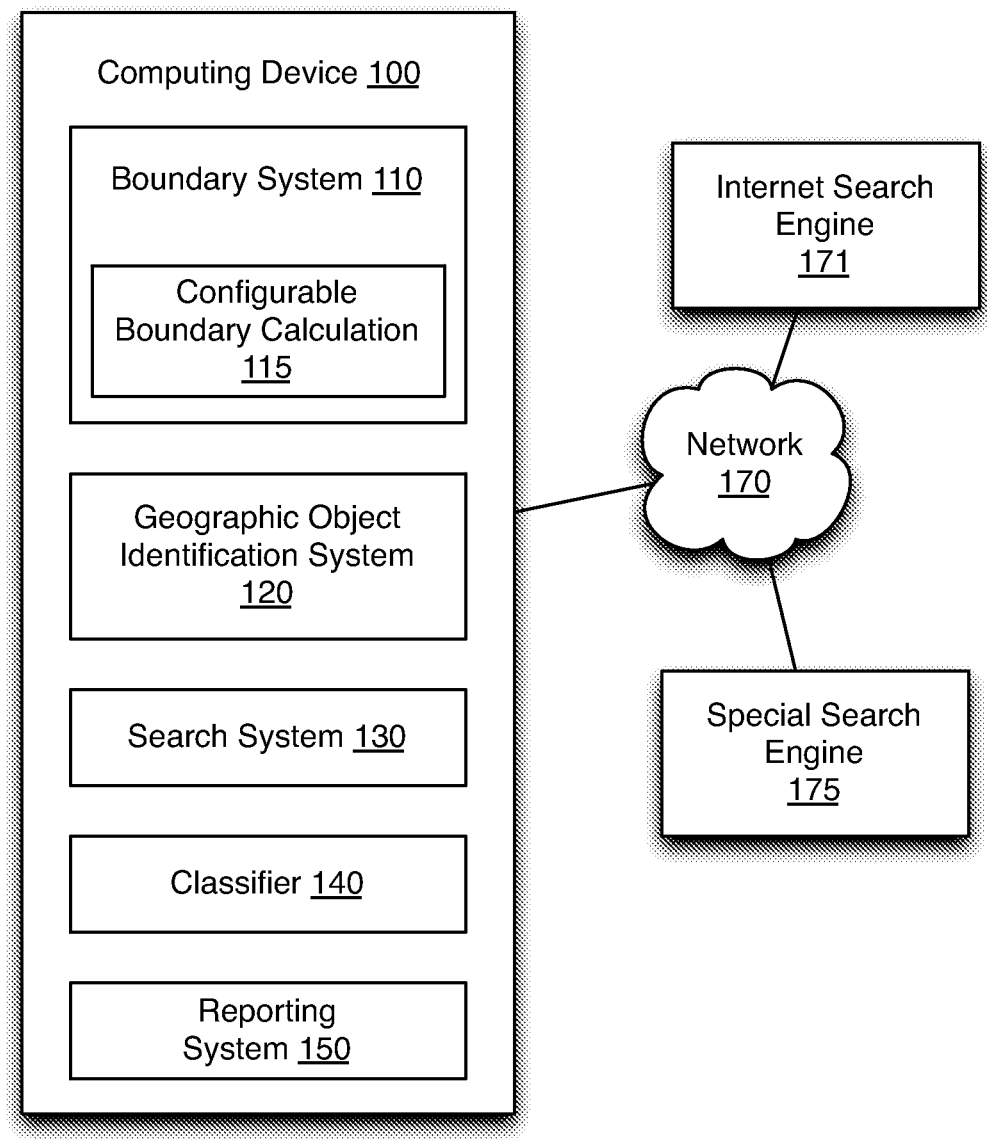
FIG. 1 illustrates a computing architecture in accordance with certain embodiments.

FIG. 1 illustrates a computing architecture in accordance with certain embodiments. In FIG. 1, a computing device 100 includes a boundary system 110, a geographic object identification system 120, a search system 130, a classifier 140, and a reporting system 150. The boundary system 110 includes a configurable boundary calculation 115 module. The computing device 100 is coupled to a network 170 which includes an Internet search engine 171, and a specialized search engine 175. In certain embodiments, the boundary system 110 determines the boundary of a user defined bounded area. In certain embodiments, the configurable boundary calculation module 115 calculates a boundary based on the configuration and certain input parameters. In certain embodiments, the geographic object identification system 120 determines the one or more geographic objects that, at least partially, reside within the boundary.

In certain embodiments, the search system 130 generates search queries for the geographic objects identified. In certain embodiments, the search system 130 submits the search queries to the Internet search engine 171 and receives the matching unstructured information (e.g., blogs, news, advertisements, documents, images, videos, etc.). "Unstructured information" is defined herein as information whose intended meaning is only implied by its form. One suitable example of unstructured information is a document organized merely into sentences, paragraphs and pages. Other suitable examples of unstructured information include blogs, news, advertisements, and electronic media such as audio or video files. "Structured information" is defined herein as information whose intended meaning is unambiguous and explicitly represented in a structure or format of the data. One suitable example of structured information is a database table. In certain embodiments, the search system 130 submits the queries to the special search engine 175; in certain embodiments, the special search engine 175 retrieves unstructured information from private networks. In certain embodiments, the special search engine 175 performs searches of sites (Internet, or private network) requiring authentication and authorization. In certain other embodiments, the special search engine 175 may perform search queries using non-textual search terms such as images.

Figure 2:
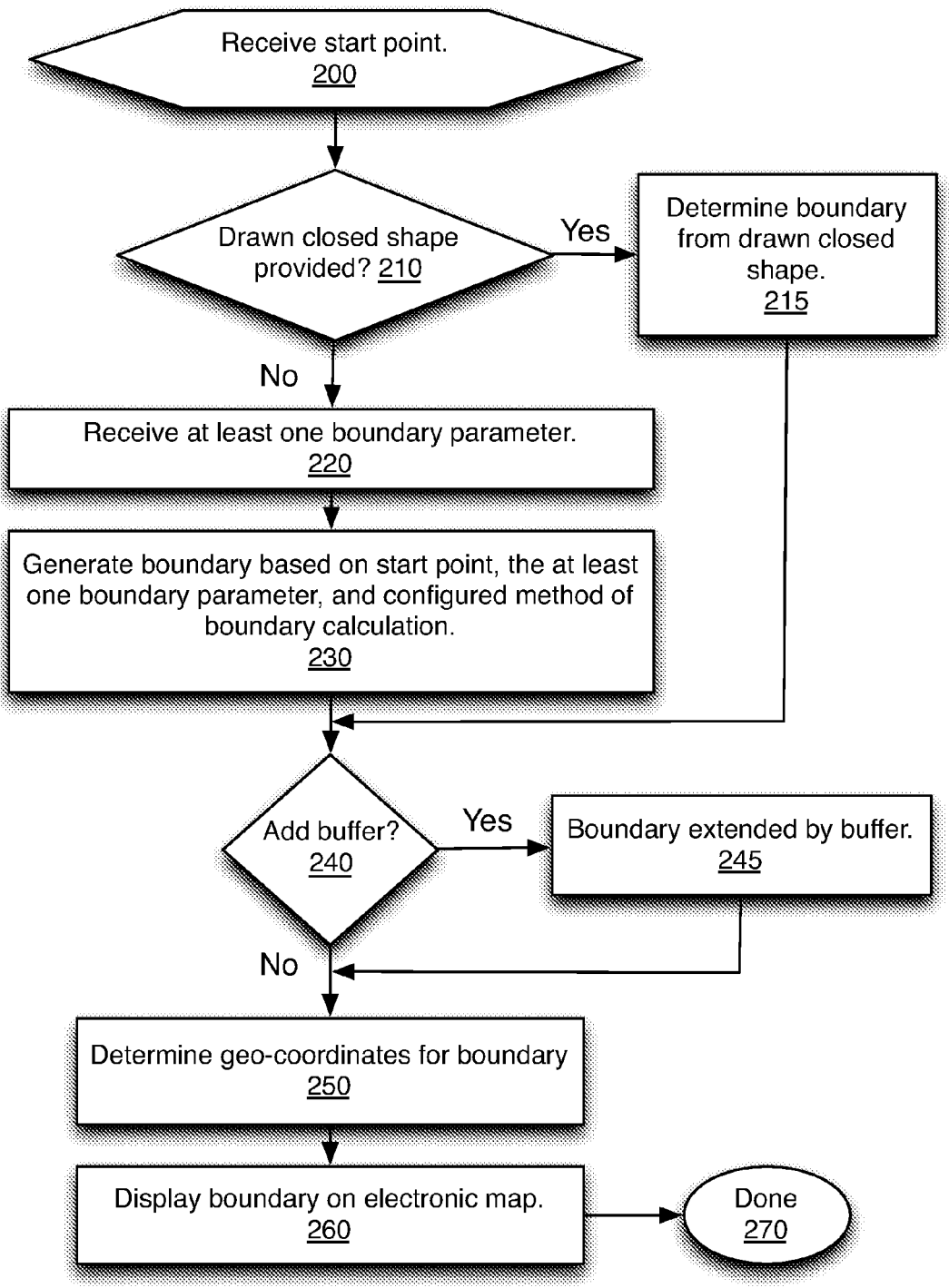
FIG. 2 illustrates, in a flow diagram, operations for determining the boundary, in accordance with certain embodiments.

FIG. 2 illustrates, in a flow diagram, operations for determining the boundary, in accordance with certain embodiments. Control begins at block 200 with the boundary system 110 receiving the start point on a displayed electronic map. At block 210, the boundary system 110 determines if the boundary will be provided by a drawn closed shape, if so processing continues to step 215, otherwise processing continues to step 220.

Figure 3:
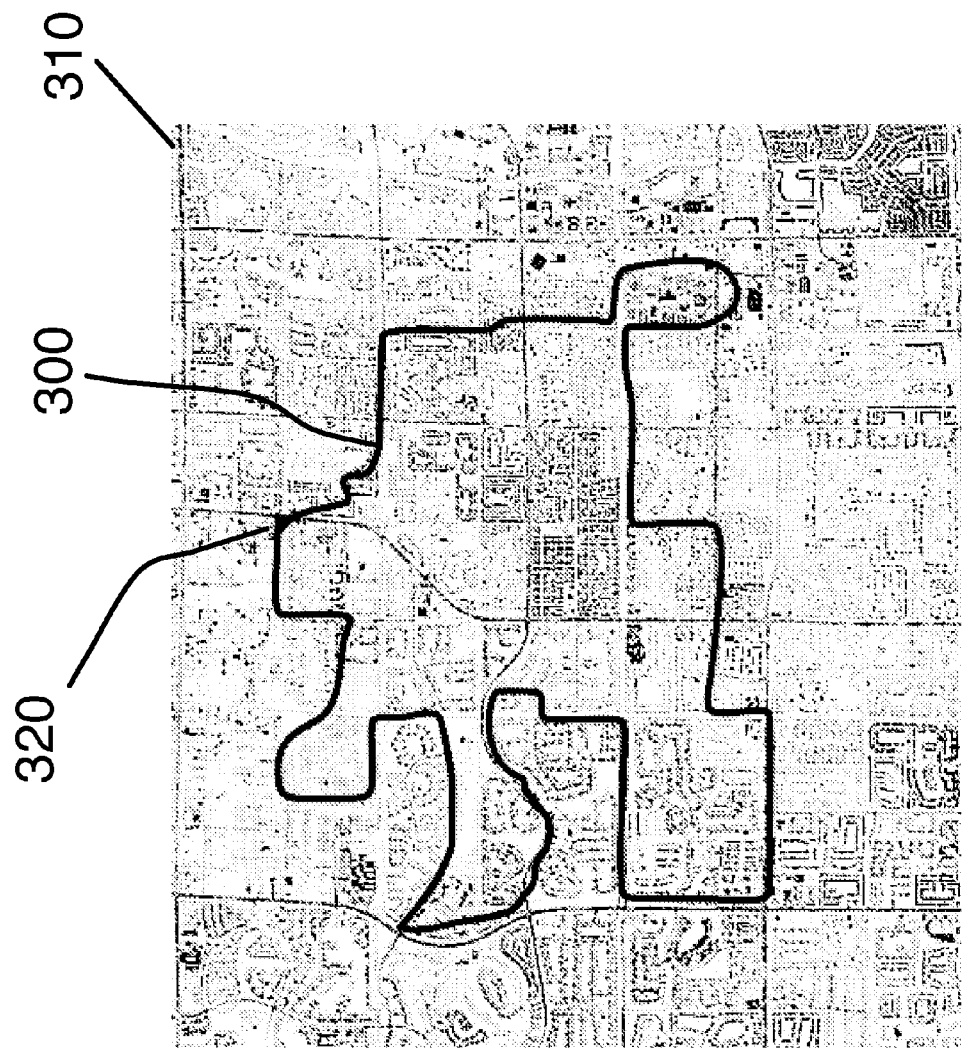
FIG. 3 illustrates a closed shape drawn over an electronic map, in accordance with certain embodiments.

At step 215, the closed shape, drawn over an electronic map, is used to determine a boundary. With embodiments, a closed shape is drawn on an electronic map display with user gestures, for example, a touch-based interface (e.g., a computer having a touch screen). The user may interact with the screen using a finger, stylus, etc., to input the user gestures and accordingly the drawn closed shape. FIG. 3 illustrates a closed shape 300 drawn over an electronic map 310, in accordance with certain embodiments. As illustrated, a user selects a start point 320 on the electronic map 310 and interacts with a touch screen draw a closed shape, ending at the start point 320. In certain embodiments, when the user drawing returns to the start point 320 a completion signal is provided to the boundary system 110 indicating the user has completed drawing the closed shape. In certain other embodiments, a separate completion signal is provided by the user (e.g. user interface control, button, etc.) to indicate the user has completed drawing the closed shape. Once the boundary is determined based on the user drawn closed shape, processing continues with step 240.

At step 220, at least one boundary parameter is received by the boundary system 110. At block 230, the boundary is generated based on the start point, the at least one boundary parameter, and a configured method of boundary calculation. In certain embodiments, the configurable boundary calculation module 115 calculates the boundary using the configuration, start point, and at least one boundary parameter. By way of example, at least one boundary parameter (e.g. drive time at the speed limit) is provided by the user to be used together with a start point to calculate a boundary (e.g. a boundary that includes all points reachable within the drive time boundary parameter provided from the start point); the boundary calculation module 115 is configured to calculate the projected distance driven on each street that is connected to the starting point and taking the collection of resulting distances and generating a closed boundary. At step 240 a determination is made whether a buffer will be added to the boundary, if so, processing continues to step 245 where the boundary is extended by the buffer otherwise processing continues to step 250. The buffer is a distance that extends the boundary and may be a constant value, or it may vary. In certain embodiments the buffer will extend the boundary a configured distance away from the centroid of the boundary area. In certain other embodiments, the boundary will be extended for each street to the next intersection. Processing continues at step 250 where the geographic coordinates (geo-coordinates) associated with the boundary are determined. Boundary information is defined herein as information about the boundary. One suitable example of boundary information is a list of geo-coordinates determined in step 250. In certain embodiments the geo-coordinates will be determined by the overlaying the resulting boundary onto the electronic map. In certain embodiments the geo-coordinates of the boundary are provides as a list of geo-coordinates starting with the start point (plus any additional buffer) at a configured precision. Processing continues to step 260 where the boundary is displayed on the electronic map, and the boundary processing is complete at step 270.

Figure 4:
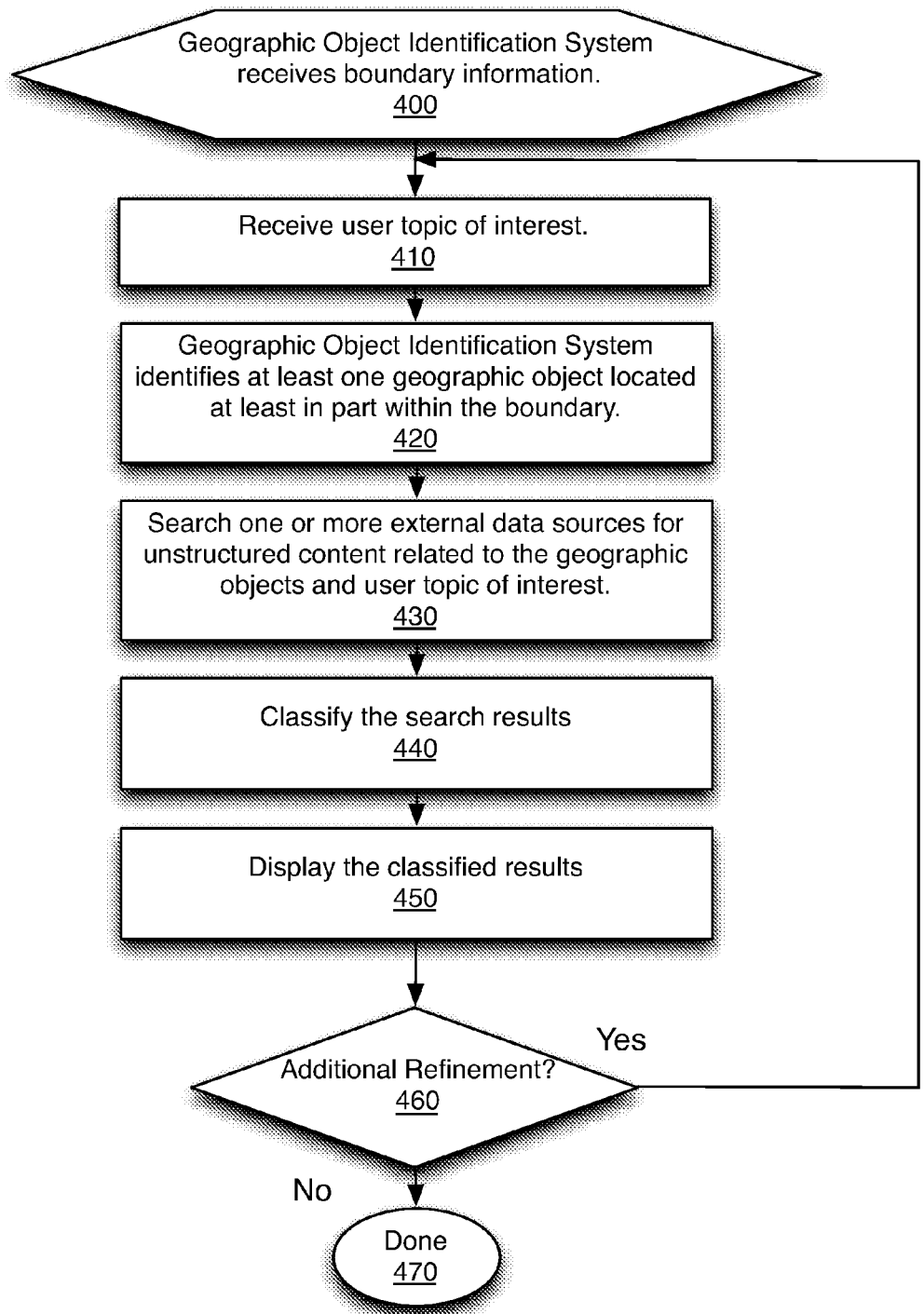
FIG. 4 illustrates in a flow diagram, operations performed to classify and display information related to geographic objects within a boundary, in accordance with certain embodiments.

FIG. 4 illustrates in a flow diagram, operations performed to classify and display information related to geographic objects within a boundary, in accordance with certain embodiments. Control begins at block 400 with the geographic object identification system 120 receiving the boundary information from the boundary system 110 (as described in certain embodiments above). At block 410, the topic of user interest (e.g., school ratings, school sentiment, police activity, emergency room, flowers, etc.) is received. In certain embodiments, the topic of interest may be entered through a user interface. In certain embodiments, if a topic of interest is not provided, a default topic of interest is configured in the geographic object identification system 120. In certain other embodiments, if a topic of interest is not provided then the topic of interest will be "all topics."

At block 420, the geographic object identification system 120, identifies at least one geographic object at least partially within the boundary. In certain embodiments, the identification occurs automatically upon completion of the boundary determination. In certain embodiments, identification includes geographic coordinates and text description of the geographic object; in certain other embodiments, identification includes images and/or metadata about the image. In certain embodiments, the electronic map is set for detail display and geographic objects are displayed, whereby the geographic object names and geographic coordinates are graphically extracted (e.g., optical character recognition) from the detailed display; in addition to names, any other type of information displayed (e.g., images or shape) may be extracted. In certain embodiments, geographic objected are determined to be within the boundary using a point in polygon solution. In certain other embodiments, the geographic object identification system 120 is configured to accept partial intersections with the boundary (e.g. a school zone that crosses the boundary). In certain other embodiments, the geographic object identification system 120 compares the boundary with known regions (school zones, water districts, etc.) to identify regions that exist within (or overlap) the boundary, and include those regions as geographic objects. In certain embodiments, web mapping tools provide geographic objects within the geo-boundaries. In certain other embodiments, the geographic coordinates of the boundary are converted to street addresses using, for example, geocoding; the set of addresses existing within the boundary are then determined and each separate address is identified as a geographic object.

In block 430, a search of unstructured information is performed on each geographic object identified in step 420, together with the user topic of interest. The search is performed using at least one external data source using the search system 130. In certain embodiments, the search is performed dynamically, capturing the latest information available. In certain embodiments, the search is performed using indexed information gathered by crawling, and not with searchable fields such as found in structured databases. In certain embodiments, the search terms will include the text description of the geographic coordinate; in certain embodiments, the search terms will also include the street address of the geographic object; in certain other embodiments, the search terms may include any type of graphical information associated with the geographic object (e.g. image or shape). In certain embodiments, search system 130 uses the geographic objects provided by the geographic object identification system 120 and user topic of interest to perform searches over the network 170 using web search engine 171 and special search engine 175. As an illustration, if the user topic of interest is "flowers," the search engine 175 will search unstructured information for each geographic object with the term "flowers." In certain embodiments, in addition to text based information, search results include media based information such as images, audio, video, graphics, and such. In certain embodiments, if the results include media information, at least one additional search may be performed with the metadata associated with that media information (e.g., geotagging) and the results of the at least one additional search would be combined with the results. By way of example, if the results include an image of a popular tourist site with geotagging, an additional search may be performed with the text from the geotagging to gather additional results not included in the first results (e.g., recent news, feedback, etc.).

Processing continues to block 440 where the search results are classified with classifier 140. In certain embodiments, an ontological classification is performed using an ontology, and in certain other embodiments the results are semantically classified using dictionaries and rules to classify the information based on semantics. By way of example, if the topic interest was flowers the resulting search information may be classified based upon the search result and an ontology for flowers (e.g. Flower Shop, Flower Garden, Flower Exhibition, etc.). At block 450, the reporting system 150 displays the classified results. In certain embodiments, the reporting system organizes the results and prioritizes the results based upon date and classification. At block 460, the reporting system determines if the user wants further refinement of the topic based on the results, and if so processing continues to step 410, otherwise processing ends at step 470. Further refinement may be desired if the initial topic of interest is too broad (e.g., "all topics"), thereby enabling the user to perform multiple searches with multiple classifications until the desired level is achieved.

In certain embodiments, a user interested in the police activity within a particular area describes the boundary of interest with the boundary identification system 110, configures the entity identification system to identify all addresses within the boundary, provides a topic of interest of "police activity" to the entity identification system, and configures the entity identification system to use addresses to perform searches. The search system 130 would perform an internet search with engine 171 and special searches with special search engine 175 for all addresses within the boundary. The search system will search for "police activity" for all addresses identified by the geographic object identification system 120. In certain embodiments, police activity would be expanded to include all terms that are typically related to this type of search. The results from the search system 130 would be classified by the classifier 140 and the results reported by the reporting system 150. In certain embodiments, the reporting system may summarize statistics found by the search such as sentiment analysis using a semantic analysis. In certain embodiments, the picture and video results of the search may be separately reported and could be selected by the user.

In certain embodiments, real time information may be provided by the search. Selecting a boundary of driving distance within 10 minutes and a topic of interest of "emergency room wait times" provides a current wait time for emergency rooms within a 10 minute drive of a specific location. Real-time information would also be provided for any search from news sources or other real-time sources available from the internet search engine 171 or special search engine 175.

Although finding points of interest on an electronic map facilitates locating basic needs such as food and fuel, finding generalized information about an area is restricted to text based searching by zip code, city name, or subdivision. Thus embodiments disclosed herein provide real-time reporting (classified and detailed) of information about a custom boundary, either drawn on an electronic map or calculated. The reports enable real-time analysis of an area that is uniquely and easily defined by a user. The boundary is used as a query parameter, and not filtered from a corpus of information, thereby improving the performance and limiting the need for a separate structured database.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 5:
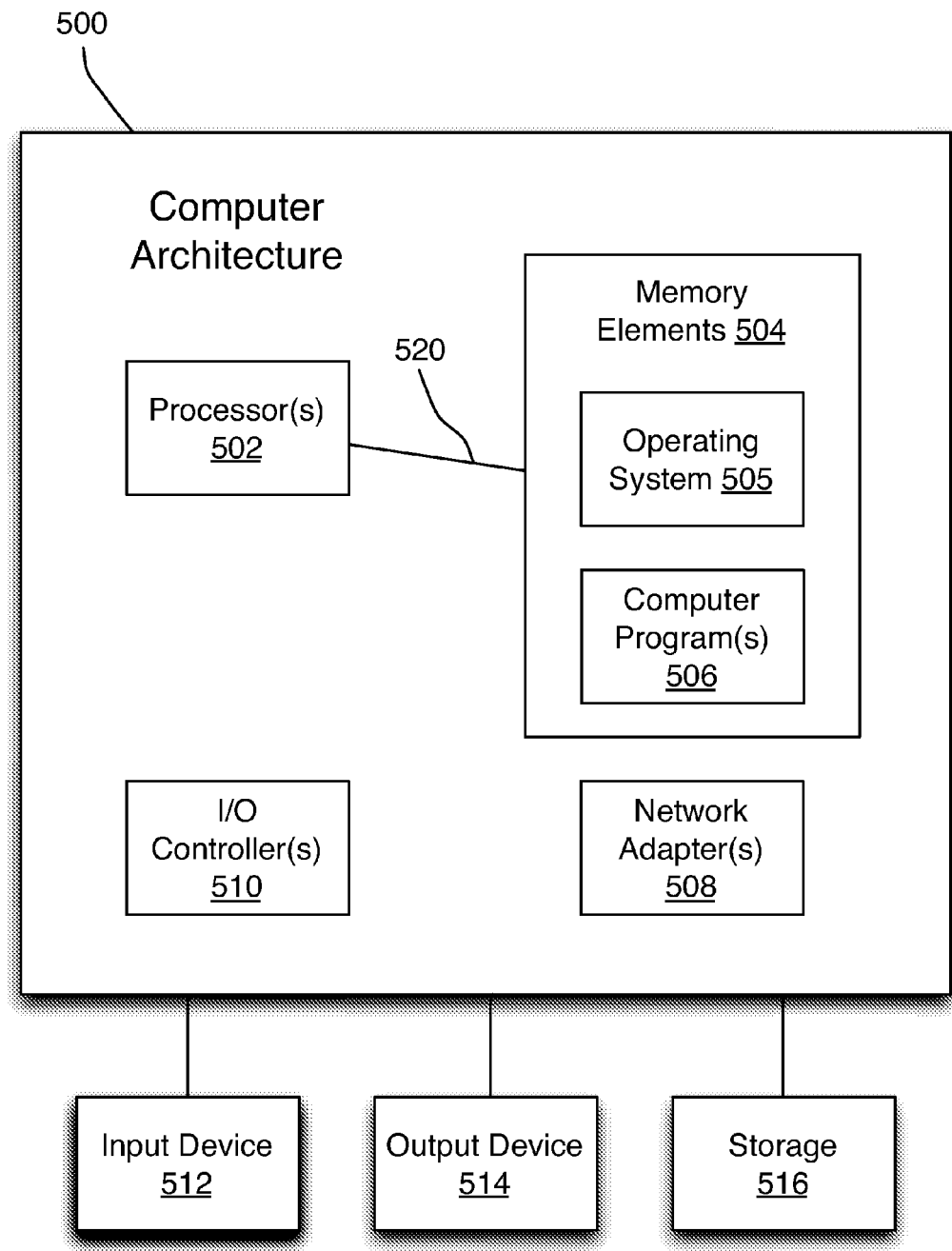
FIG. 5 illustrates a computer architecture that may be used in accordance with certain embodiments.

FIG. 5 illustrates a computer architecture 500 that may be used in accordance with certain embodiments. In certain embodiments, computing device 100 may implement computer architecture 500. The computer architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The computer architecture 500 may be coupled to storage 516 (e.g., any type of storage device; a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The computer architecture 500 may include fewer components than illustrated, additional components not illustrated herein, or some combination of the components illustrated and additional components. The computer architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer implemented method for classifying and displaying information, comprising:
   determining a boundary within an electronic map based on a drawn closed shape, by at least one computing processor;
   receiving a query that requests real-time information about a user topic of interest with reference to an amount of drive time, by the at least one computing processor;
   identifying at least one geographic object at least partially within the boundary, wherein each geographic object is representable by one or more geographic coordinates, by the at least one computing processor;
   performing a first search for the at least one geographic object and the user topic of interest using an internet search engine;
   performing a second search for the at least one geographic object and the user topic of interest using a special search engine that retrieves unstructured information from a private network with authentication and performs at least one non-textual search;
   receiving a plurality of search results, by the at least one computing processor;
   analyzing the search results with the real-time information to generate a response to the query that includes classifying the plurality of search results into multiple categories according to the user topic of interest, by the at least one computing processor; and
   displaying the classified search results, by the at least one computing processor.

2. The method of claim 1, wherein determining is performed automatically upon receiving the drawn closed shape.

3. The method of claim 1, wherein determining the boundary further comprises:
   extending the drawn closed shape by a buffer.

4. The method of claim 1, wherein classifying is performed with ontological classification.

5. The method of claim 1, wherein the first search and the second search are performed dynamically.

6. The method of claim 1, wherein identifying further comprises:
   automatically extracting the at least one geographic object displayed on a detail display of the electronic map.

7. The method of claim 1, further comprising:
   performing a third search using metadata associated with media contained in the plurality of search results; and
   adding new results of the second search to the plurality of search results.

\* \* \* \* \*